United States Patent
Hercock et al.

(10) Patent No.: US 11,989,289 B2
(45) Date of Patent: May 21, 2024

(54) REMEDIATING SOFTWARE VULNERABILITIES

(71) Applicant: BRITISH TELECOMMUNICATIONS PUBLIC LIMITED COMPANY, London (GB)

(72) Inventors: Robert Hercock, London (GB); Giulio Giaconi, London (GB)

(73) Assignee: British Telecommunications Public Limited Company (GB)

( * ) Notice: Subject to any disclaimer, the term of this patent is extended or adjusted under 35 U.S.C. 154(b) by 429 days.

(21) Appl. No.: 17/309,531

(22) PCT Filed: Dec. 1, 2019

(86) PCT No.: PCT/EP2019/083206
§ 371 (c)(1),
(2) Date: Jun. 3, 2021

(87) PCT Pub. No.: WO2020/114923
PCT Pub. Date: Jun. 11, 2020

(65) Prior Publication Data
US 2022/0027465 A1    Jan. 27, 2022

(30) Foreign Application Priority Data
Dec. 3, 2018  (EP) ..................... 18209888

(51) Int. Cl.
*G06F 21/54* (2013.01)
*G06F 18/214* (2023.01)
(Continued)

(52) U.S. Cl.
CPC .......... *G06F 21/554* (2013.01); *G06F 18/214* (2023.01); *G06F 21/54* (2013.01);
(Continued)

(58) Field of Classification Search
CPC ............................. G06F 21/54; G06F 21/554
See application file for complete search history.

(56) References Cited

U.S. PATENT DOCUMENTS 9,185,095 B1    11/2015  Moritz et al.
9,514,293 B1    12/2016  Moritz et al.
(Continued)

FOREIGN PATENT DOCUMENTS

CN    107633263 A    1/2018
CN    107885999 A    4/2018
(Continued)

OTHER PUBLICATIONS

Accessed from the internet: exploit-db.com (provided by Offensive Security, accessed on Dec. 2, 2018.
(Continued)

*Primary Examiner* — William S Powers
(74) *Attorney, Agent, or Firm* — Pranger Law PC

(57) ABSTRACT

A computer implemented method of remediating an increased vulnerability of a software system including a plurality of software components, the method including generating a vector representation of each software component derived from a neural network trained using training data defined from known vulnerabilities of the software components in the software system; aggregating the vector representations for the software component to an aggregate vector representation for a particular time; repeating the generating and the aggregating for a plurality of points in time to generate multiple generations of aggregate vector representations; comparing the multiple generations of aggregate vector representations to detect a change in an aggregate vector representation exceeding a maximum threshold degree of change as an indication of an increased vulnerability of the software system, responsive to which iteratively adjusting the software components in the soft-
(Continued)

ware system and, at each iteration, regenerating an aggregate vector representation for the software system so adjusted to compare with the multiple generations of aggregate vector representations to identify a software component adjustment leading to a change in vector representation not exceeding the maximum threshold degree of change so as to reduce the vulnerability of the software system.

13 Claims, 7 Drawing Sheets

(51) Int. Cl.
*G06F 21/55* (2013.01)
*G06F 21/57* (2013.01)
*G06N 3/044* (2023.01)
*G06N 3/084* (2023.01)

(52) U.S. Cl.
CPC .......... *G06F 21/577* (2013.01); *G06N 3/044* (2023.01); *G06N 3/084* (2013.01)

(56) References Cited

U.S. PATENT DOCUMENTS

| | | | |
|---|---|---|---|
| 9,798,876 B1 | 10/2017 | Parker-Wood et al. | |
| 10,114,954 B1* | 10/2018 | Bellis | G06F 21/577 |
| 10,749,883 B1 | 8/2020 | Martin et al. | |
| 10,793,286 B1 | 10/2020 | Carrico et al. | |
| 10,949,534 B2 | 3/2021 | Martin et al. | |
| 11,108,787 B1 | 8/2021 | Shen et al. | |
| 2005/0114278 A1 | 5/2005 | Saptharishi et al. | |
| 2005/0193281 A1 | 9/2005 | Ide et al. | |
| 2007/0112824 A1* | 5/2007 | Lock | G06F 11/0754 707/999.102 |
| 2009/0172815 A1* | 7/2009 | Gu | H04L 63/145 726/23 |
| 2009/0234899 A1 | 9/2009 | Kramer | |
| 2010/0114973 A1 | 5/2010 | Goyal | |
| 2011/0214157 A1* | 9/2011 | Korsunsky | H04L 63/1425 726/1 |
| 2011/0321164 A1 | 12/2011 | Saxena et al. | |
| 2012/0072983 A1 | 3/2012 | Mccusker et al. | |
| 2012/0131674 A1 | 5/2012 | Wittenschlaeger | |
| 2014/0096249 A1 | 4/2014 | Dupont et al. | |
| 2014/0173737 A1* | 6/2014 | Toback | G06F 21/57 726/25 |
| 2014/0245443 A1 | 8/2014 | Chakraborty | |
| 2014/0279762 A1 | 9/2014 | Xaypanya et al. | |
| 2014/0283115 A1* | 9/2014 | Ben-Natan | G06F 21/6227 726/27 |
| 2015/0020199 A1 | 1/2015 | Neil et al. | |
| 2015/0269050 A1 | 9/2015 | Filimonov et al. | |
| 2016/0021141 A1 | 1/2016 | Liu et al. | |
| 2016/0164901 A1 | 6/2016 | Mainieri et al. | |
| 2016/0205122 A1 | 7/2016 | Bassett | |
| 2016/0359695 A1 | 12/2016 | Yadav et al. | |
| 2017/0126712 A1 | 5/2017 | Crabtree et al. | |
| 2017/0279698 A1 | 9/2017 | Sartran et al. | |
| 2017/0339022 A1 | 11/2017 | Hegde et al. | |
| 2018/0004948 A1 | 1/2018 | Martin et al. | |
| 2018/0103052 A1 | 4/2018 | Choudhury et al. | |
| 2018/0152468 A1 | 5/2018 | Nor et al. | |
| 2018/0219895 A1 | 8/2018 | Silver et al. | |
| 2018/0260562 A1 | 9/2018 | Chen et al. | |
| 2018/0276372 A1* | 9/2018 | Crabtree | G06F 9/455 |
| 2018/0336437 A1 | 11/2018 | Cheng et al. | |
| 2018/0367548 A1 | 12/2018 | Stokes et al. | |
| 2018/0367553 A1 | 12/2018 | Hayden et al. | |
| 2019/0102564 A1* | 4/2019 | Li | G06N 3/04 |
| 2019/0132344 A1 | 5/2019 | Lem et al. | |
| 2019/0147333 A1 | 5/2019 | Kallur Palli Kumar et al. | |
| 2019/0173899 A1 | 6/2019 | Tews et al. | |
| 2019/0179878 A1 | 6/2019 | Collins et al. | |
| 2019/0260786 A1 | 8/2019 | Dunn | |
| 2019/0312734 A1 | 10/2019 | Wentz et al. | |
| 2020/0067969 A1 | 2/2020 | Abbaszadeh et al. | |
| 2020/0097810 A1 | 3/2020 | Hetherington et al. | |
| 2020/0175161 A1 | 6/2020 | Giaconi | |
| 2020/0304523 A1 | 9/2020 | Yadav et al. | |
| 2022/0027478 A1 | 1/2022 | Hercock et al. | |

FOREIGN PATENT DOCUMENTS

| | | |
|---|---|---|
| CN | 108108622 A | 6/2018 |
| EP | 3355547 A1 | 8/2018 |
| KR | 20180076753 A | 7/2018 |
| WO | 2017019391 A1 | 2/2017 |
| WO | 2017167544 A1 | 10/2017 |
| WO | 2017167545 A1 | 10/2017 |
| WO | 2018224669 A1 | 12/2018 |
| WO | 2018224670 A1 | 12/2018 |

OTHER PUBLICATIONS

Campello R.J.G.B., et al., "Density-Based Clustering Based On Hierarchical Density Estimates," In Prosecution Advances in Knowledge Discovery and Data Mining, Part II, LNAI 7819, 2013, pp. 160-172.

Clinchant S., et al., "Aggregating Continuous Word Embeddings for Information Retrieval," Proceedings of the Workshop on Continuous Vector Space Models and their Compositionality, Aug. 9, 2013, pp. 100-109.

Combination Search and Examination Report under Sections 17 & 18(3) for Great Britain Application No. 1819711.1, dated Jun. 10, 2019, 5 pages.

Combined search and Examination Report for Great Britain Application No. 1819704.6, dated Jun. 4, 2019, 5 pages.

Combined search and Examination Report for Great Britain Application No. 1819705.3, dated May 28, 2019, 9 pages.

Combined search and Examination Report for Great Britain Application No. 1819706.1, dated Jun. 4, 2019, 5 pages.

Combined search and Examination Report for Great Britain Application No. 1917563.7, dated Apr. 24, 2020, 5 pages.

Common Vulnerabilities and Exposures (CVE) repository provided by the Mitre Corporation accessed from the Internet: www.cvedetails.com and www.cvedetails.com on Dec. 2, 2018.

CVSS, "Common Vulnerability Scoring System v3.0:Specification Document," CVSS v3.0 Specification (v1.3), retrieved from https://www.first.org/cvss/v3.0/specification-document, 19 pages.

Despois J., "Stop Feeding Garbage To Your Model !—The 6 biggest mistakes with datasets and how to avoid them," Mar. 16, 2018, retrieved from https://hackernoon.com/stop-feeding-garbage-to-your-model-the-6-biggest-mistakes-with-datasets-and-how-to-avoid-them-3cb7532ad3b7, on 2019-05-17, 10 pages.

Ester M, et al., "A Density-Based Algorithm For Discovering Clusters In Large Spatial Databases With Noise," Proceedings of Knowledge Discovery and Data Mining, AAAI, 1996, 6 pages.

Extended European Search Report for European Application No. 18209886.3, dated Feb. 27, 2019, 6 pages.

Extended European Search Report for European Application No. 19212759.5, dated Apr. 14, 2020, 6 pages.

Extended European Search Report For Application No. 18209884.8, dated Feb. 21, 2019, 8 pages.

Extended European Search Report For Application No. 18209887.1, dated Mar. 6, 2019, 9 pages.

Extended European Search Report For Application No. 18209888.9, dated Feb. 27, 2019, 10 pages.

Extended European Search Report For Application No. 18209889.7, dated Feb. 25, 2019, 10 pages.

Extended European Search Report For Application No. 18209890.5, dated Feb. 25, 2019, 9 pages.

Fawaz H I., et al., "Data Augmentation Using Synthetic Data for Time Series Classification with Deep Residual Networks," Aug. 7, 2018, XP055555584, Retrieved from the Internet: URL: https://arxiv.org/pdf/1808.02455.pdf , 8 pages.

(56) References Cited

OTHER PUBLICATIONS

GB Combined Search and Examination Report for GB Application No. 1819700.4, dated May 22, 2019, 7 pages.
GB Combined Search and Examination Report for GB Application No. 1819702.0, dated May 13, 2019, 7 pages.
Guennec A L., et al., "Data Augmentation for Time Series Classification using Convolutional Neural Networks," Sep. 19, 2016, XP055555602, Retrieved from the Internet: URL: https://aaltd16.irisa.fr/files/2016/08/AALTD16_paper_9.pdf, 8 pages.
Han Z., et al., "Learning to Predict Severity of Software Vulnerability Using Only Vulnerability Description," 2017 IEEE International Conference on Software Maintenance and Evolution (ICSME), Sep. 2017, DOI:10.1109/ICSME.2017.52, 12 pages.
International Preliminary Report on Patentability for Application No. PCT/EP2019/083203, dated Jun. 17, 2021, 8 pages.
International Preliminary Report on Patentability for Application No. PCT/EP2019/083204, dated Jun. 17, 2021, 9 pages.
International Preliminary Report on Patentability for Application No. PCT/EP2019/083205, dated Jun. 17, 2021, 9 pages.
International Preliminary Report on Patentability for Application No. PCT/EP2019/083206, dated Jun. 17, 2021, 9 pages.
International Search Report and Written Opinion for Application No. PCT/EP2019/083203, dated Feb. 6, 2020, 14 pages.
International Search Report and Written Opinion for Application No. PCT/EP2019/083204, dated Feb. 6, 2020, 16 pages.
International Search Report and Written Opinion for Application No. PCT/EP2019/083205, dated Mar. 16, 2020, 15 pages.
International Search Report and Written Opinion for Application No. PCT/EP2019/083206, dated Feb. 6, 2020, 15 pages.
Internet forum site, "What is data augmentation in machine learning?," available from Internet: https://www.quora.com/What-is-data-augmentation-in-deep-learning (QUORA) relevant with reference to common general knowledge, 3 pages.
Ji T., et al., "The Coming Era of Alpha-Hacking?: A Survey of Automatic Software Vulnerability Detection, Exploitation and Patching Techniques," 2018 IEEE Third International Conference On Data Science In Cyberspace, Jun. 18, 2018, XP033375337, DOI: 10.1109/DSC.2018.00017, pp. 53-60.
Jinwon A., et al., "Variational Autoencoder based Anomaly Detection using Reconstruction Probability," Progress in Biomedical Optics and Imaging, SNU Data Mining Center, 2015-2 Special Lecture on IE, Dec. 27, 2015, XP055491966, ISSN: 1605-7422, ISBN: 978-1-5106-0027-0, 18 pages.
Le T., et al., "Maximal Divergence Sequential Auto-Encoder for Binary Software Vulnerability Detection," preprint during peer review phase ICLR 2019, Nov. 26, 2018, XP055556671, Retrieved from the Internet https://openreview.net/references/pdf?id=r1kmFWY0X, on Feb. 14, 2019, 15 pages.
Li Z., et al., "VulDeePecker: A Deep Learning-Based System For Vulnerability Detection," Jan. 5, 2018, Network and Distributed Systems Security (NDSS) Symposium, XP055556046, Retrieved from the Internet [URL:https://arxiv.org/pdf/1801.01681.pdf], on Feb. 13, 2019, 15 pages.
Lim S K., et al., "Doping: Generative Data Augmentation for Unsupervised Anomaly Detection with GAN," Aug. 24, 2018, 2018 IEEE International Conference on Data Mining (ICDM), Nov. 1, 2018, DOI: 10.1109/ICDM.2018.00146, ISBN: 978-1-5386-9159-5,11 pages.
Lokman S F., et al., "Optimised Structure of Convolutional Neural Networks for Controller Area Network Classification," 2018, 14th International Conference on Natural Computation, Fuzzy Systems and Knowledge Discovery, 7 pages.
Mikolov T., et al., "Efficient Estimation Of Word Representations In Vector Space," Arxiv, CORR (Computing Research Repository], Sep. 7, 2013, pp. 1-12.
National Vulnerability Database (NVD), a U.S. government repository of standards-based vulnerability management data represented using the Security Content Automation Protocol (SCAP), NVD is available on the internet: https://nvd.nist.gov/ accessed on Dec. 2, 2018.
Pei J., et al., "Advances in Knowledge Discovery and Data Mining, Part II," 17th Pacific-Asia Conference, PAKDD 2013, Gold Coast, Australia, Apr. 2013, Proceedings, Part II, 608 pages.
Radford B.J., et al., "Network Traffic Anomaly Detection Using Recurrent Neural Networks," Mar. 28, 2018, XP055554771, Retrieved from the Internet, https://arxiv.org/pdf/1803.10769.pdf, 7 pages.
Ring M., et al., "Flow-based Network Traffic Generation Using Generative Adversarial Networks," Sep. 27, 2018, available from: https://arxiv.org/abs/1810.07795, (Ring 1) [see the abstract and whole document and especially note figs 3, 4, 5 and related text], 37 pages.
Ring M., et al., "IP2Vec: Learning Similarities Between IP Addresses," IEEE International Conference on Data Mining Workshops, 2017, 10 pages.
Rumelhart D.E., et al., "Learning Internal Representations By Error Propagation," Institute for Cognitive Science Report 8506, Sep. 1985, 49 pages.
Staudemeyer R.C., et al., "Evaluating Performance of Long Short-term Memory Recurrent Neural Networks on Intrusion Detection Data," Proceedings of the South African Institute for Computer Scientists and Information Technologists Conference On, SAICSIT '13, Oct. 7-9, 2013, pp. 218-224.
Wong S C., et al., "Understanding Data Augmentation For Classification: When To Warp?," Sep. 28, 2016, XP055555467, retrieved from https://ieeexplore.ieee.org/ielx7/7794373/7796973/07797091.pdf?tp=arnumber=7797091&isnumber=7796973, on Feb. 13, 2019, 6 pages.
Zhang J., et al., "Robust Network Traffic Classification," IEEE/ACM Transactions on Networking, vol. 23, No. 4, Aug. 2015, pp. 1257-1270.
Zhang R., et al., "Aggregating Neural Word Embeddings for Document Representation," ECIR 2018, Computer Science, Mar. 1, 2018, 12 pages.
Zhuo X., "Network Intrusion Detection using Word Embeddings," 2017 IEEE International Conference on Big Data, 10 pages.
Combined Search and Examination Report under Sections 17 and 18(3) for Great Britain Application No. 1819703.8, dated May 13, 2019, 6 pages.
Combined Search and Examination Report under Sections 17 and 18(3) for Great Britain Application No. 1917557.9, dated May 20, 2020, 5 pages.
Chandola, et al., "Anomaly Detection for Discrete Sequences: A Survey", IEEE Transactions on Knowledge and Data Engineering, vol. 24, No. 5, May 2012, pp. 823-839.
Cui et al. "Data Augmentation for Deep Neural Network Acoustic Modeling", IEEE/ACM Transactions on Audio, Speech, and Language Processing, vol. 23, No. 9, Sep. 2015, pp. 1469-1477.
Dau et al. "Anomaly Detection Using Replicator Neural Networks Trained on Examples of One Class", Simulated Evolution and Learning, 2014, pp. 311-322.
Eddy, Sean R. "What is a Hidden Markov Model?", Nature Biotechnology, vol. 22 No. 10, Oct. 2004, pp. 1315-1316.
Extended European Search Report for Application No. 19150867.0, dated Jun. 6, 2019, 10 pages.
Extended European Search Report for Application No. 19217369.8, dated May 15, 2020, 10 pages.
Extended European Search Report for European Application No. 18209885.5, dated Mar. 6, 2019, 10 pages.
Gartner et al. "On Graph Kernels: Hardness Results and Efficient Alternatives", COLT/Kernel 2003, Learning Theory and Kernel Machines, Lecture Notes in Computer Science, vol. 2777, 2003, pp. 129-143.
Gibson, Michael, "Application and File History for U.S. Appl. No. 16/738,614, filed Jan. 9, 2020", (Copy Not Attached).
Goyal et al. "Capturing Edge Attributes via Network Embedding", IEEE Transactions on Computational Social Systems, vol. 5, No. 4, Apr. 2018, 10 pages.
Goyal et al. "DynGEM: Deep Embedding Method for Dynamic Graphs", University of Southern California, Retrieved from the Internet: https://arxiv.org/pdf/1805.11273.pdf, May 29, 2018, 8 pages.
Grover et al. "node2vec: Scalable Feature Learning for Networks", Available Online at <https://arxiv.org/abs/1607.00653v1>, Jul. 3, 2016, 10 pages.

(56) References Cited

OTHER PUBLICATIONS

Heimann et al. "On Generalizing Neural Node Embedding Methods to Multi-Network Problems", MLG'17, Aug. 2017, 4 pages.

Izakian et al. "Anomaly Detection and Characterization in Spatial Time Series Data: A Cluster-Centric Approach", IEEE Transactions on Fuzzy Systems, vol. 22, No. 6, Dec. 2014, pp. 1612-1624.

Kim et al. "Web Traffic Anomaly Detection using C-LSTM Neural Networks", Expert Systems with Applications, vol. 105, 2018, pp. 66-76.

Li et al. "Multivariate Time Series Anomaly Detection: A Framework of Hidden Markov Models", Applied Soft Computing, vol. 60, 2017, pp. 229-240.

Izakian et al. "Clustering Spatiotemporal Data: An Augmented Fuzzy C-Means", IEEE Transactions on Fuzzy Systems, vol. 21, No. 5, Oct. 2013, pp. 855-868.

Muromagi et al. "Linear Ensembles of Word Embedding Models", Proceedings of the 21st Nordic Conference of Computational Linguistics, May 23-24, 2017, pp. 96-104.

Niepert et al. "Learning Convolutional Neural Networks for Graphs", Proceedings of the 33rd International Conference on Machine Learning, New York, NY, USA, 2016. JMLR: W&CP vol. 48, arXiv: 1605.05273v4 [cs.LG], Jun. 8, 2016, 10 pages.

Rumelhart et al. "Learning Representations by Back-Propagating Errors", Nature, vol. 323, Oct. 9, 1986, pp. 533-536.

Search Report under Section 17 for Great Britain Application No. 1900272.4, dated May 28, 2019, 5 pages.

"The PageRank Citation Ranking: Bringing Order to the Web", , Jan. 29, 1998, pp. 1-17.

Vishwanathan et al. "Graph Kernels", Journal of Machine Learning Research, vol. 11, 2010, pp. 1201-1242.

Weisstein, Eric W. "Isomorphic Graphs", WolframMathworld, From MathWorld—A Wolfram Web Resource, Available Online at <https://mathworld.wolfram.com/IsomorphicGraphs.html>, Oct. 2018, 2 pages.

Yu et al. "Learning Deep Network Representations with Adversarially Regularized Autoencoders", Proceedings of the 24th ACM SIGKDD International Conference on Knowledge Discovery & Data Mining, KDD '18, vol. 23, Aug. 19-23, 2018, pp. 2663-2671.

\* cited by examiner

REMEDIATING SOFTWARE VULNERABILITIES

PRIORITY CLAIM

The present application is a National Phase entry of PCT Application No. PCT/EP2019/083206, filed Dec. 1, 2019, which claims priority from EP Patent Application No. 18209888.9, filed Dec. 3, 2018, each of which is hereby fully incorporated herein by reference.

TECHNICAL FIELD

The present disclosure relates to the detection and remediation of software systems vulnerable to attack.

BACKGROUND

Network connected computer systems, whether physical and/or virtual computer systems connected via one or more physical and/or virtual network communication mechanisms, can be susceptible to malicious attack. For example, one or more computer systems can become infected with malicious software such as botnet agents or the like, and such infected systems can instigate malicious communication with other systems such as communications intended to propagate such infections and/or communications intended to affect the operation of target computer systems (e.g. denial of service attacks, hijacking or the like).

Such attacks can involve the exploitation of vulnerabilities within software systems executing on a computer system. Vulnerabilities can arise due to design flaws, inadequate or flawed programming or logic, oversight, erroneous or mis-configuration, use of software outside its design parameters, flaws or errors in the way software responds to other interfacing software or requests, and other sources and/or causes of vulnerability as will be apparent to those skilled in the art.

SUMMARY

It is a longstanding desire to effectively detect and remediate vulnerabilities in software systems.

The present disclosure accordingly provides, in a first aspect, a computer implemented method of remediating an increased vulnerability of a software system including a plurality of software components, the method comprising: generating a vector representation of each software component derived from a neural network trained using training data defined from known vulnerabilities of the software components in the software system; aggregating the vector representations for the software component to an aggregate vector representation for a particular time; repeating the generating and aggregating steps for a plurality of points in time to generate multiple generations of aggregate vector representations; comparing the multiple generations of aggregate vector representations to detect a change in an aggregate vector representation exceeding a maximum threshold degree of change as an indication of an increased vulnerability of the software system, responsive to which iteratively adjusting the software components in the software system and, at each iteration, regenerating an aggregate vector representation for the software system so adjusted to compare with the multiple generations of aggregate vector representations to identify a software component adjustment leading to a change in vector representation not exceeding the maximum threshold degree of change so as to reduce the vulnerability of the software system.

The present disclosure accordingly provides, in a first aspect, a computer implemented method of remediating an increased vulnerability of a software system including a plurality of software components, the method comprising: accessing data records each corresponding to a known software vulnerability, each data record including an identification of one or more software components affected by the vulnerability; generating, for each of at least a subset of the data records, one or more training data items for a neural network, each training data item associating a vulnerability of the data record with affected software components identified by the data record, the neural network having input units corresponding to items in a corpus of all software components and output units corresponding to items in a corpus of all vulnerabilities; training the neural network using the training data so as to define a vector representation for each software component in the corpus of all software components based on weights in the neural network for an input unit corresponding to the software component; aggregating, for a subset of software components in the corpus corresponding to software components in the software system, vector representations for each software component in the subset to an aggregate vector representation for the software system for the particular time; repeating the accessing, generating, augmenting, training and aggregating steps at a subsequent time to generate multiple generations of aggregate vector representations for the software system, each generation corresponding to data records accessed at a different time; comparing the multiple generations of aggregate vector representations for the software system to detect a change in one or more aggregate vector representation exceeding a maximum threshold degree of change as an indication of an increased vulnerability of the software system; responsive to the indication of an increased vulnerability, iteratively adjusting the software components in the software system and, at each iteration, regenerating an aggregate vector representation for the software system so adjusted, and comparing each regenerated aggregate vector representation with the multiple generations of aggregate vector representations to identify a software component adjustment leading to a change in vector representation not exceeding the maximum threshold degree of change so as to reduce the vulnerability of the software system.

In some embodiments, adjusting the software components in the software system includes replacing a software component in the software system with a compatible alternative software component.

In some embodiments, adjusting the software components in the software system includes replacing a software component in the software system with an alternative version of the software component.

In some embodiments, adjusting the software components in the software system includes upgrading or updating a software component in the software system.

In some embodiments, adjusting the software components in the software system includes patching a software component in the software system with an available software patch intended to reduce a vulnerability of the software component.

In some embodiments, a new neural network is trained at each repetition of the training.

In some embodiments, the neural network has a single layer of hidden units, the number of which is smaller than each of: a number of input units of the neural network; and a number of output units of the neural network.

In some embodiments, comparing multiple generations of aggregate vector representations includes performing a vector similarity function on the aggregate vector representations to determine a degree of similarity.

In some embodiments, the identification of a change in an aggregate vector representation indicative of an increased vulnerability of the software system includes detecting a vector similarity below a predetermined threshold degree of similarity.

In some embodiments, comparing multiple generations of aggregate vector representations includes, for each of one or more software components in the corpus of all software components, training a recurrent neural network based on the multiple generations of aggregate vector representations such that the trained recurrent neural network is suitable for classifying a subsequent aggregate vector representation as indicative of increased vulnerability in relation to multiple generations of aggregate vector representations.

The present disclosure accordingly provides, in a third aspect, a computer system including a processor and memory storing computer program code for performing the method set out above.

The present disclosure accordingly provides, in a fourth aspect, a computer program element comprising computer program code to, when loaded into a computer system and executed thereon, cause the computer to perform the method set out above.

BRIEF DESCRIPTION OF THE FIGURES

Embodiments of the present disclosure will now be described, by way of example only, with reference to the accompanying drawings, in which.

DETAILED DESCRIPTION OF EMBODIMENTS

Figure 1:
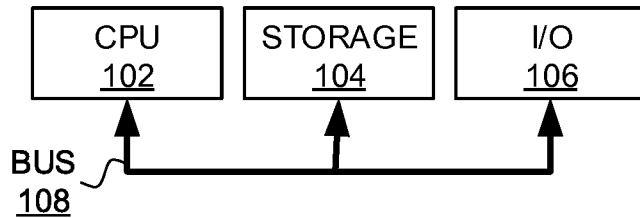
FIG. 1 is a block diagram a computer system suitable for the operation of embodiments of the present disclosure.

Embodiments of the present disclosure address the challenge of detecting vulnerabilities in a computer software system and, in particular, monitoring vulnerabilities over time to identify changes in vulnerabilities affecting the software system. Changes in vulnerabilities can usefully trigger protective, corrective or remediative measures where remediation can include reducing an extent of vulnerability of a software system to an acceptable level. It is to be acknowledged that software systems cannot always be rendered devoid of all vulnerabilities. This state of affairs arises due to the complexity of modern software, the interfaces between software systems and the scope of potential use of software systems that can extend beyond contemplated design constraints. Nonetheless, preference for maximum acceptable degree of vulnerability can be defined for a software system such that, for example, certain vulnerabilities are acknowledged and tolerated while other vulnerabilities are intolerable and require mitigation or remediation. Mitigation of a vulnerability can include introduction, deployment or configuration of protective measures. For example, a software system vulnerable to a malware infection or attack can be complemented by antimalware facilities to mitigate the effect of such attacks. Remediation measures for a vulnerability can include removing a known vulnerability altogether such as by patching, updating or replacing a known flawed software component or the like.

Software systems are suites of software components arranged together to perform a function, provide a service or application. Software components of potentially multiple different classes (types) can be brought together in a software system. For example, classes of software component can include, inter alia: operating systems; databases; middleware; transaction handling services; applications software; communications libraries; user interface libraries; and other classes of software as will be apparent to those skilled in the art. Software components within these classes can be combined or otherwise brought together to constitute a software system. For example, a particular operating system can be combined with a particular user application and a particular database to provide a software system. Such particular software are known as software components.

Embodiments of the present disclosure generate representations of a software system in terms of vulnerabilities affecting the software system, such representations being generated over time for comparison to detect changes in the representations that indicate an increased vulnerability of the software system. When detected, increased vulnerability can trigger protective measures and/or remediation measures for the software system. The representations of vulnerabilities are known as embeddings in which a software system is represented as a vector representation derived based on attributes of vulnerabilities affecting the software system. In some embodiments, individual software components and/or classes of software component for a software system are represented in a vector representation and aggregated to provide an aggregate vector representation comparable over time The generation of the vector representations as embeddings is achieved by training a fully connected neural network with a single hidden layer (the hidden layer being preferably smaller than input and output layers). Each unit in the input layer corresponds to a software component or class of components. Each unit in the output layer corresponds to a vulnerability. There is an input unit for each item in a corpus of all software, such corpus including, for example, all software components and all classes of software component. Similarly, there is an output unit for each vulnerability in a corpus of all vulnerabilities, such as a corpus of vulnerabilities stored in a vulnerability database or register.

The neural network is trained using training data derived from records of vulnerabilities stored in, for example, a vulnerability database. Such an approach to the generation of embeddings is described in detail in "IP2Vec: Learning Similarities between IP Addresses" (Ring et al, 2017 IEEE International Conference on Data Mining Workshops) which itself builds upon the approach described in detail in "Efficient Estimation of Word Representations in Vector Space" (Mikolov et al., ArXiv, CoRR (Computing Research Repository), 2013). Both Ring et al. and Mikolov et al. are specifically cited here for their respective disclosures which, combined with the present specification, are to be read to provide sufficient disclosure of the present disclosure.

Embodiments of the present disclosure improve upon the approach of Ring et al. and Mikolov et al. by, inter alia, the application of such embedding generation to vulnerability data over time for comparison to detect increased vulnerability of a software system. Further, embodiments of the present invention provide improvements including, inter alia, the triggering of mitigation and/or remediation measures. Yet further, embodiments of the present invention provide improvements including, inter alia, by use of pre-processing of training data to enhance the characterization of vulnerabilities in the generated embeddings.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
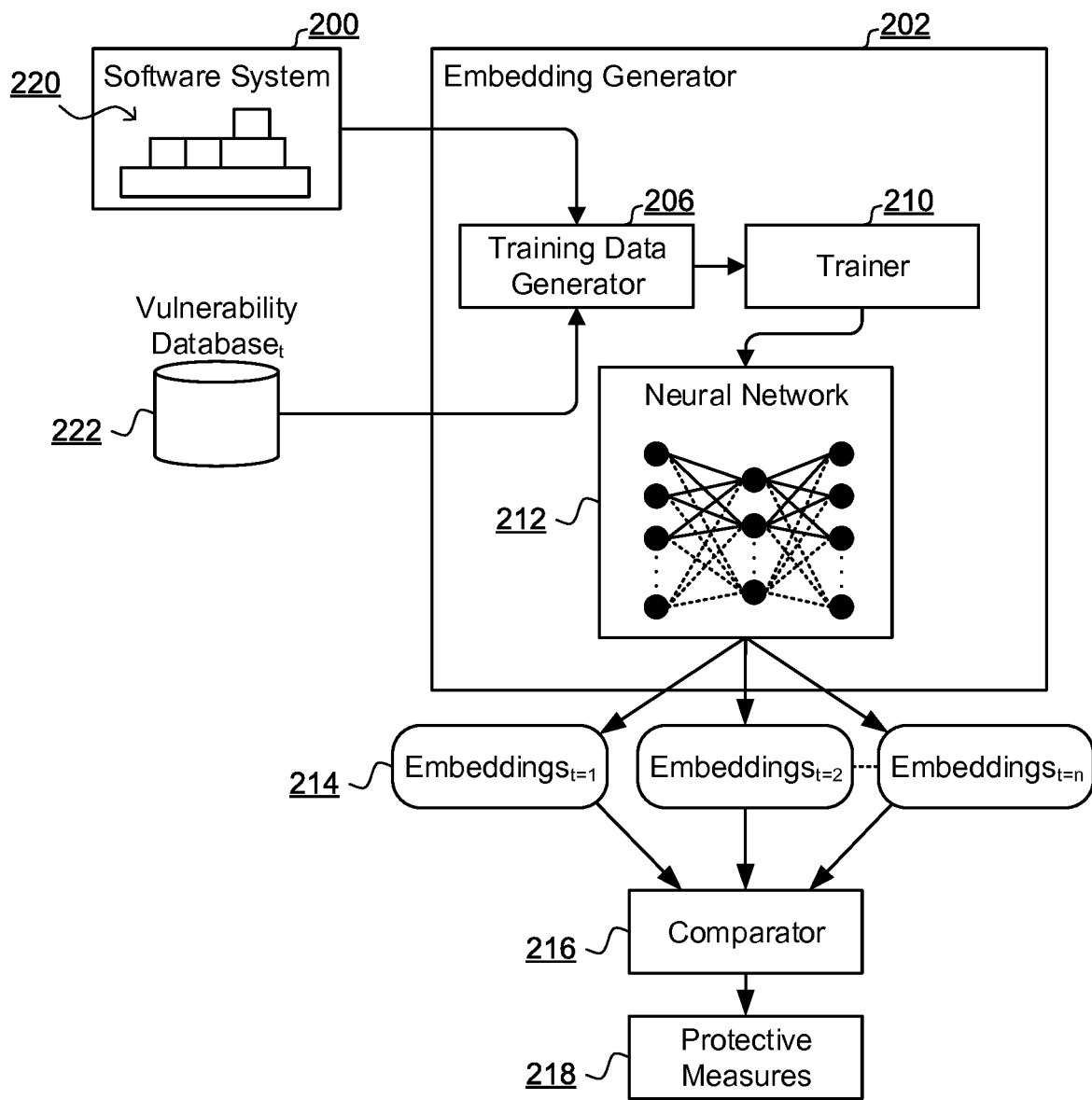
FIG. 2 is a component diagram of a computer implemented arrangement for detecting increased vulnerability of a software system in accordance with embodiments of the present disclosure.

FIG. 2 is a component diagram of a computer implemented arrangement for detecting increased vulnerability of a software system 200 in accordance with embodiments of the present disclosure. The software system 200 is an arrangement, aggregation and/or deployable specification of particular software components 220, each software component belonging to a class of software component. An embedding generator 202 is provided as a hardware, software, firmware or combination component for generating embeddings 214 as vector representations of the software system 220. The embedding generator 202 receives data records from a vulnerability database 222. The vulnerability database 222 is a data store storing information about known vulnerabilities affecting software as will be described in detail below with respect to FIG. 3. While indicated and described as a database it will be appreciated that the vulnerability database 222 can equally be provided as a simple repository, website, data dump, document store or other suitable data store for storing vulnerability information. Similarly, while this description refers to records stored within, accessed within and/or received from the vulnerability database 222, it will be appreciated by those skilled in the art that such data records are items, structures, reports, documents or other units of data storing vulnerability information as will be described below.

Figure 3:
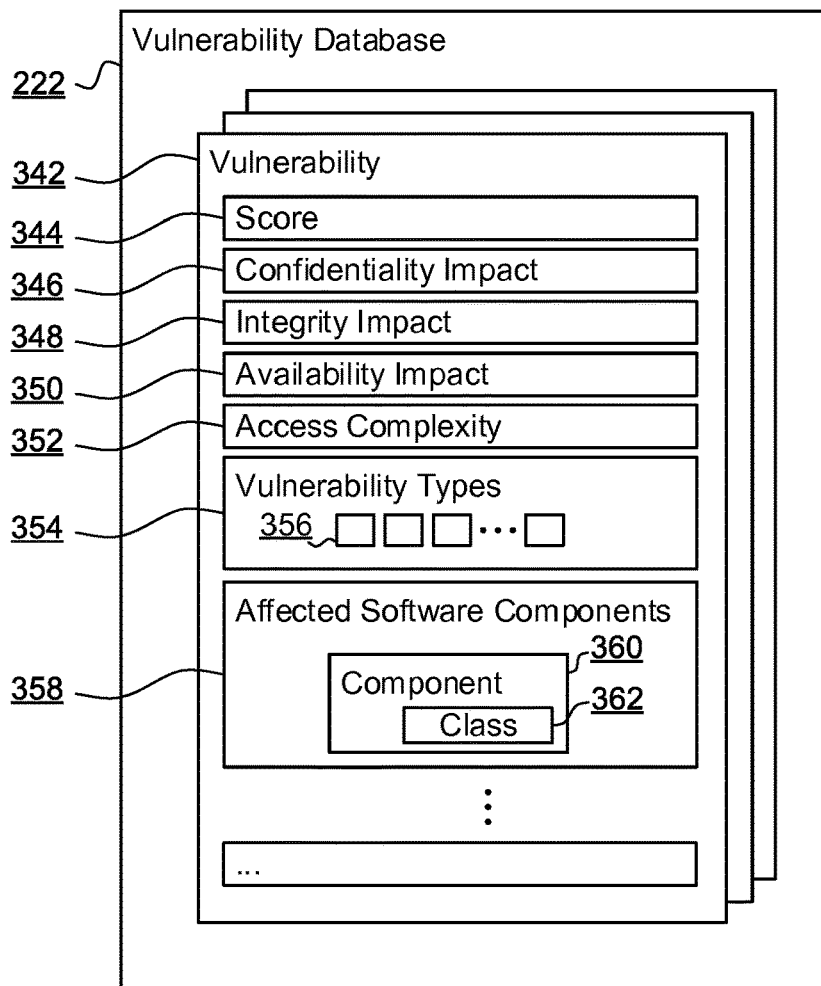
FIG. 3 is a depiction of an exemplary vulnerability database in accordance with embodiments of the present disclosure.

FIG. 3 is a depiction of an exemplary vulnerability database in accordance with embodiments of the present disclosure. The vulnerability database 222 of FIG. 3 includes a plurality of vulnerability records 342 each including information about a known vulnerability. Each vulnerability will be identified in the vulnerability database 222 such as by a unique identifier, a unique name or similar (not illustrated). In the exemplary record 342 the following exemplary data fields are provided. It will be appreciated that the exemplary data fields are not necessarily mandatory or exhaustive:

A score 344 for the vulnerability 342 such as a score for characterizing characteristics and a severity of the vulnerability. For example, the Common Vulnerability Scoring System (CVSS) as defined in "Common Vulnerability Scoring System v3.0: Specification Document" available at www.first.org.

A confidentiality impact 346 for the vulnerability 342 indicating, for example, a degree of information disclosure possible as a result of exploitation of the vulnerability 342. The confidentiality impact 346 can be provided as a discrete (enumerated) indication or a continuous score.

An integrity impact 348 for the vulnerability 342 indicating, for example, an extent to which exploitation of the vulnerability 342 might compromise the integrity of a software system containing the vulnerability 342. The integrity impact 348 can be provided as a discrete (enumerated) indication or a continuous score.

An availability impact 350 for the vulnerability 342 indicating, for example, an extent to which exploitation of the vulnerability 342 might compromise the availability of a software system containing the vulnerability 342, such as by way of reduced performance, access to the software service, denial of service, resource availability and the like. The availability impact 350 can be provided as a discrete (enumerated) indication or a continuous score.

An access complexity 352 of the vulnerability 342 indicating, for example, how readily a vulnerability can be exploited such as whether special preconditions must be satisfied and the like. The access complexity 352 can be provided as a discrete (enumerated) indication or a continuous score.

A set of vulnerability types 354 for the vulnerability 342 including indications of one or more vulnerability types 356 each corresponding to a class of vulnerability. Such classes can include, for example, inter alia: denial of service vulnerabilities; ability to execute code vulnerabilities; data access or data leak vulnerabilities; memory overflow vulnerabilities; memory corruption vulnerabilities; and other classes of vulnerability as will be apparent to those skilled in the art.

A set of one or more software components 358 known to be affected by the vulnerability 342. For example, each software component 360 in the set 358 includes an indication of its class of software component.

Other fields and/or attributes of the vulnerability 342— whether objective or subjectively defined—as will be apparent to those skilled in the art.

Thus, the vulnerability database 222 constitutes a source of information regarding vulnerabilities including an indication of affected software components 358 and, preferably, classes of software components 362. While a single vulnerability database 222 is illustrated it will be appreciated that a composite of a plurality of vulnerability databases 222 such as complementary databases or other data stores can be used. An example of a vulnerability database 222 is the Common Vulnerabilities and Exposures (CVE) repository provided by the Mitre Corporation at www.cvedetails.com and cve.mitre.org (accessed on 2 Dec. 2018). The CVE repository is provided by way of webpages containing entries for each of a plurality of known cybersecurity vulnerabilities, each vulnerability including substantially all of the fields illustrated in the vulnerability record 342 of FIG. 4. Additionally or alternatively, databases of vulnerability information can be obtained via, inter alia: exploit-db.com (provided by Offensive Security, accessed on 2 Dec. 2018); and the National Vulnerability Database (NVD), a U.S. government repository of standards-based vulnerability management data represented using the Security Content Automation Protocol (SCAP) (NVD is available at nvd.nist.gov accessed on 2 Dec. 2018).

Returning to FIG. 2, the embedding generator 202 receives a plurality of data records such as record 342 for vulnerabilities from the vulnerability database 222. The records received by the embedding generator 202 can constitute all records in the database 222 or some select subset of records in the database 222 such as records relating to vulnerabilities affecting a certain subset of classes of software component, vulnerabilities affecting certain software components, or vulnerabilities satisfying any number of criteria defined in terms of characteristics of vulnerabilities including those characteristics indicated in FIG. 3 and other characteristics not indicated. The embedding generator 202 includes a training data generator 206 as a software, hardware, firmware or combination component arranged to access data records from the vulnerability database 222 and generate training data for a neural network 212. In some embodiments, the training data is generated according to the approach of Mikolov et al. and Ring et al. save for the data utilized for training the neural network 212 is software and vulnerability information (see, for example, section IV of Ring et al. and the example illustrated in FIG. 3 of Ring et al.) Each vulnerability database 222 record is used to generate one or more training data items.

In one embodiment, the neural network 212 is trained using tuples each consisting of a class of software component and a vulnerability (i.e. (class, vulnerability) pairs). Additionally or alternatively, the neural network 212 is trained using tuples each consisting of a particular software component within a particular class and a vulnerability (i.e. (software component of class c, vulnerability) pairs). Further additionally or alternatively, the neural network 212 is trained using tuples each consisting of a particular software component (of any class) and a vulnerability (i.e. (software component, vulnerability) pairs). For provision to train the neural network 212 each element of a tuple can be encoded as a one-hot vector. In some embodiments, tuples are provided for each software (e.g. each software class or each software component) in a corpus of all software (e.g. each software component in a corpus of all software components, such as all software components indicated in the vulnerability database 222 or, at least, in a selected subset of records in the vulnerability database 222). Similarly, in some embodiments, tuples are provided for each vulnerability in a corpus of all vulnerabilities, such as all vulnerabilities included in the vulnerability database 222 or, at least, in a selected subset of records in the vulnerability database 222. Thus, a first element in a training data item tuple is used as an input for the neural network 212 (encoded as a one-hot vector) and a second element in a training data item tuple is used as a desired output for the neural network 212 (encoded as a one-hot vector). A backpropagation training algorithm can be applied to train the neural network using such pairs of values (see, for example, "Learning internal representations by backpropagating errors", D. E. Rumelhart, G. E. Hinton, R. J. Williams, September 1985, Institute for Cognitive Science Report 8506, University of California, San Diego). In some embodiments, the neural network 212 is trained using stochastic gradient descent and backpropagation.

Figure 4:
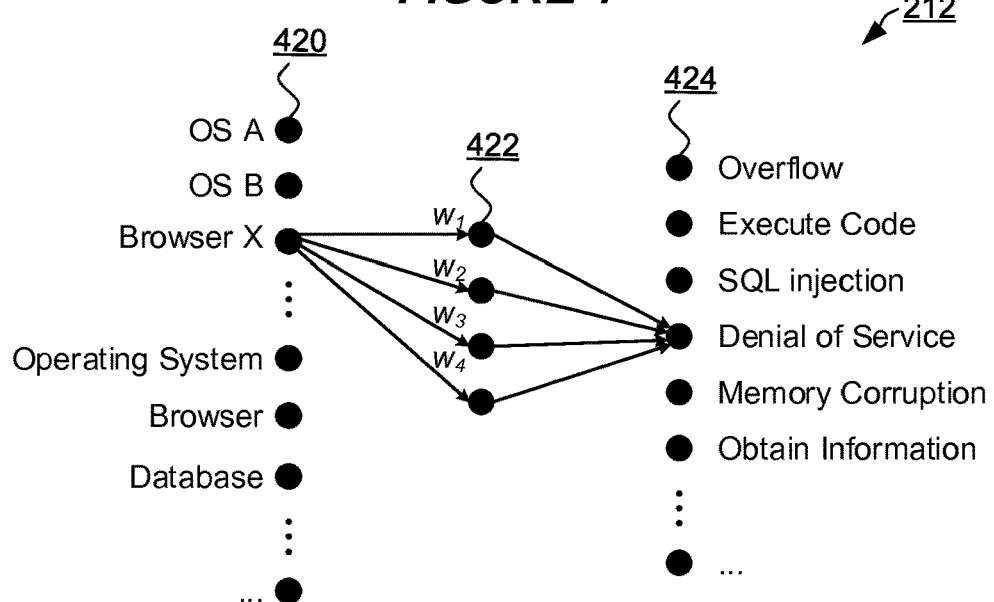
FIG. 4 depicts a partial exemplary neural network suitable for operation in embodiments of the present disclosure.

Once trained, the neural network 212 serves as a basis for defining a plurality of vector representations for each software component and/or class in the corpus according to the input data of the neural network. According to Ring et al., for a particular input unit corresponding to a software component or class, a vector constituted by the values of the weights of all connections in the neural network 212 from the input unit to each hidden unit can constitute a vectoral embedding for the software component or class. Referring now to FIG. 4 which depicts a partial exemplary neural network 212 suitable for operation in embodiments of the present invention. The neural network 212 of FIG. 4 is a partial representation because it shows only the connections between a single input unit and hidden unit, and between the hidden units and an output unit. The neural network 212 of FIG. 4 depicts a set of input units 420 each corresponding to a software component (e.g. "OS A", "OS B", "Browser X") or a class of software components (e.g. "Operating System", "Brower", "Database"). Output units 424 are also provided, each being associated with a vulnerability including: "Overflow"; "Execute Code"; "SQL Injection"; "Denial of Service"; "Memory Corruption"; and "Obtain Information". FIG. 4 also depicts weights w1, w2, w3 and w4 of connections between one input unit for software component "Browser X" and a set of hidden units 422. In FIG. 4, the neural network 212 is trained with the sample {"Browser X", "Denial of Service" }, so indicated by the weighted connections between the input unit for "Browser X" and the hidden units, and between the hidden units and output unit for "Denial of Service". A vector with the components w1, w2, w3 and w4 thus constitutes a vector representation of the software component "Browser X" and is an embedding for software component "Browser X".

Thus, for each vulnerability in the vulnerability database 222 multiple embeddings can be generated stored as weights in the trained neural network 212. Additionally and optionally, embedding(s) for a software component or class can be extracted from the trained neural network 212 and stored separately in a data store or memory associated with or accessible to the embedding generator 202 (not shown). Subsequently, a set of embeddings for the software system 200 is generated as an aggregation of embeddings 214 corresponding to one or more of the software components 220 of the software system 200 and the classes of software components for components 220 in the software system 200. In one embodiment, all software components 220 and/or classes of the software system 200 are used. Alternatively, at least a subset of software components and/or classes of the software system 200 are used. The aggregation of embeddings 214 thus constitutes an aggregation of multiple vectors corresponding to the embeddings being aggregated. Several aggregation techniques can be employed for this purpose, ranging from computing the average embeddings difference of all the embeddings for the software system 200 to using more advanced techniques, such as those disclosed in "Aggregating Neural Word Embeddings for Document Representation" (R. Zhang, J. Guo, Y. Lan, J. Xu and X. Cheng, Springer, 2018) and/or "Aggregating Continuous Word Embeddings for Information Retrieval" (S. Clinchant and F.

Perronnin, in Proc. Workshop on Continuous Vector Space Models and their Compositionality, Sofia, Bulgaria, 2013). Such techniques have been applied in information retrieval settings and for determining the content of documents or paragraphs of text. Thus, the embedding generator 202 generates an aggregate embedding 214 for the software system.

Notably, the embedding generator 202 is operable temporally on the basis of the vulnerability database 222 as constituted at a point in time t. Accordingly, an embedding 214 for the software system 200 generated by the embedding generator 202 on the basis of the vulnerability database 222 at time t is referred to as Embeddings. The vulnerability database 222 will change over time according to the addition, deletion and amendment of records therein as new vulnerabilities are exposed, existing vulnerabilities are better understood, more information is made available, more analysis of vulnerabilities are conducted and so on.

According to embodiments of the present disclosure, multiple such embeddings 214 are generated, one for each of multiple different times t (points in time) using the vulnerability database 222 at that point in time (vulnerability database) such that each embedding 214 is an aggregation of vectors for software components and/or classes derived from the vector neural network 212 as trained using training data generated from data records in the vulnerability database 222 at that point in time t. In this way, multiple generations of vector representations for the software system 200 are generated, each generation corresponding to data records in the vulnerability database 222 at a different time t. The neural network 212 is trained using training data for the time t and embedding 214 is an aggregate of vector representations of weights in the trained neural network 212 for at least a subset of the software components and/or classes represented by the input units 420 for the software system 200. The aggregate vector representation for the software system 200 for a time t is then stored as embedding 214 associated with the time t, where time t changes for each aggregate thus: $embeddings_{t=1}$, $embeddings_{t=2}$ ... $embeddings_{t=n}$.

FIG. 2 also includes a comparator 216 as a software, hardware, firmware or combination component operable to receive and compare a plurality of embeddings 214, each for a different time t. In particular, the comparator 216 performs a similarity analysis on a pair of vector representations for the software system 200, each vector representation corresponding to an embedding 214 generated for a different time t. In this way, differences between embeddings 214 at different times t for the software system 200 can be discerned and, where such differences meet or exceed a maximum threshold degree of difference, a determination of the existence of an indication of a change to the vulnerability of the software system 200 can be identified. In particular, where a series of vector representations (embeddings) 214 remain or become more similar for a series of times t, such similarity is indicative of a degree of consistency of a level of vulnerability of the software system 200 over time. On the other hand, where a series of vector representations (embeddings) 214 become more dissimilar for a series of times t, such dissimilarity is indicative of a change to a level of vulnerability of the software system 200 over time and indicates an increased vulnerability of the software system 200.

The comparator 216 can make the vector comparison using a vector similarity function such as a cosine similarity function for comparing vectors as is known in the art. Sufficiency of dissimilarity (or similarity) can be predetermined in terms of a degree of difference characterized in dependence on the particular vector similarity function employed—such as an angular difference, an extent of vectoral magnitude difference or a combination or other such characterizations of difference as will be apparent to those skilled in the art.

In response to a determination of increased vulnerability of the software system 200, protective measures 218 can be implemented to protect the software system 200 and/or reduce a vulnerability of the software system 200. Such protective measures can be mitigating measures to mitigate against exploitation of vulnerabilities of the software system 200, such mitigation measures being determined by reference to, for example, the vulnerability database 222 to identify the vulnerabilities of the software system 200. Such mitigating measures can include deployable software, hardware, firmware or combination facilities or features that can include, for example, the deployment of firewalls, new security measures, additional authentication or authorization checks, execution or updating of antimalware services, preventing communication with the software system 200, increasing a level of monitoring, tracing or logging and other protective measures as will be apparent to those skilled in the art. Thus, in use, the embedding generator 202 coupled with the comparator 216 provide for the effective characterization of the software system 200 in terms of vulnerabilities of the software system 200 as vector representations (embeddings 214) for each of a plurality of times t such that changes detected between vector representations 214 can trigger the deployment of protective measures 218.

In one embodiment, a new neural network 212 is trained afresh for each different time t for which the embedding generator 202 operates. Thus, the neural network 212 for a time t is trained using training data 208 derived from vulnerability database 222 data records at that time, and each embedding 214 is defined as an aggregate of vector representations derived from the neural network 212 accordingly. In accordance with an alternative embodiment, a single neural network 212 is used for all times t such that the same neural network 212 is trained initially for a first time t=1 and is further trained (constructively) for each subsequent time t=2 to t=n for n times. In such an approach the embeddings for each time $embedding_{t=1}$, $embedding_{t=2}$ ... $embedding_{t=n}$ constitute a development of an embedding for a preceding time. Consequently, a series of embeddings arising from multiply training the same neural network 212 constitute a temporal sequence of embeddings suitable for training a further neural network as a recurrent neural network. Recurrent neural networks can be used to analyze sequential data due to their ability to take multiple inputs one after the other and save state information between inputs. Such recurrent neural networks can be trained in an unsupervised way by making the target output at each step the embeddings for a next step (prediction) or by training a sequence-to-sequence model to reconstruct the entire sequence (autoencoder). Prediction or reconstruction errors derived from a recurrent neural network can then be used by the comparator 216 to indicate how likely a given sequence of embeddings 214 is to be diverging (or becoming increasingly dissimilar) in comparison to "normal" sequences that can be defined during a training time of operation when the vulnerabilities of the software system 200 are known to be consistent. Thus, the comparator 216 can be adapted to comparing multiple generations of vector representations by training a recurrent neural network for the software system 200 based on the multiple generations of vector representation. In this way, the trained recurrent neural network is suitable for classifying a subsequent vector representation as changed or sufficiently different in relation to multiple generations of vector representations.

Figure 5:
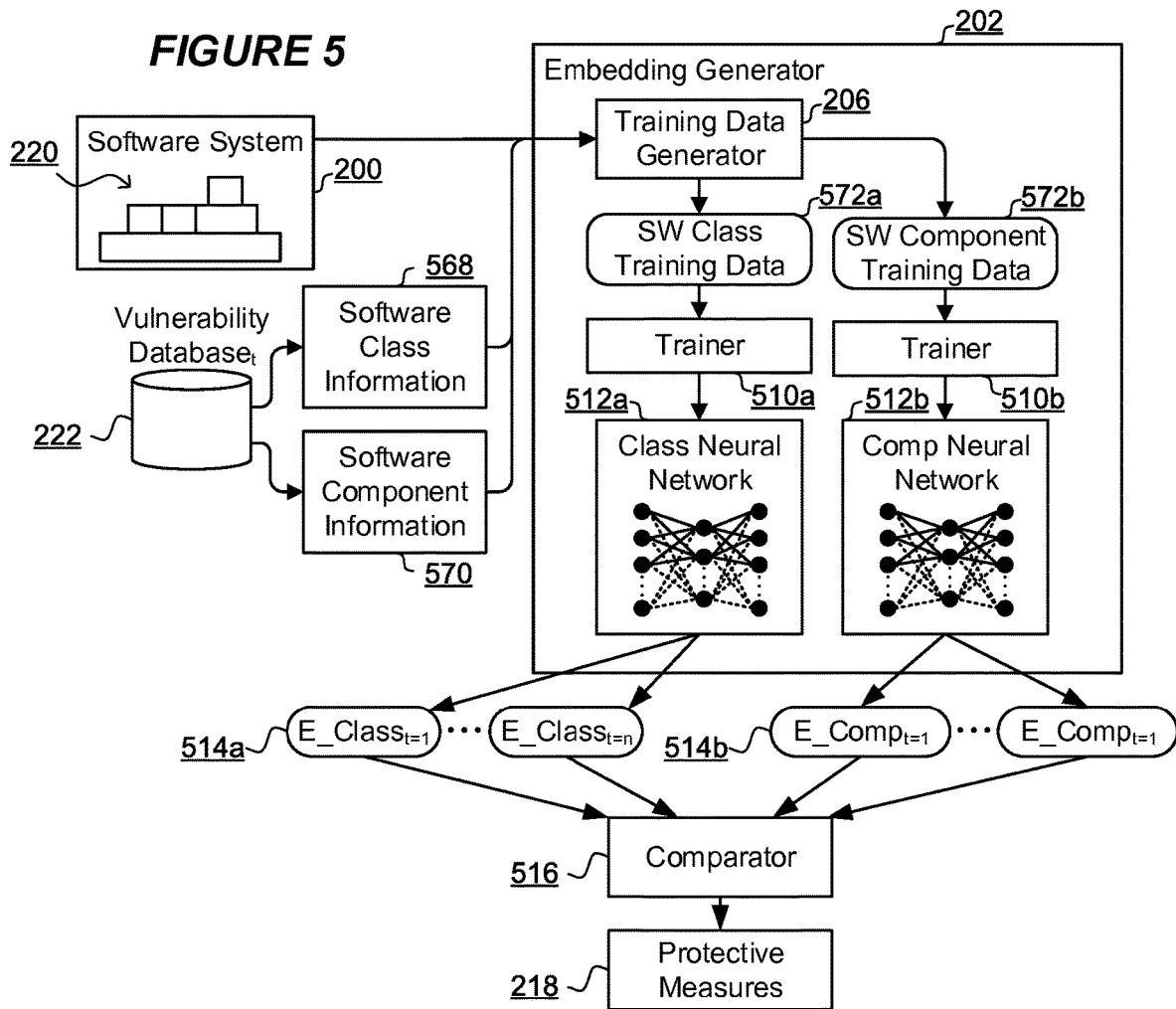
FIG. 5 is a component diagram of a computer implemented arrangement for detecting increased vulnerability of a software system in accordance with embodiments of the present disclosure.

FIG. 5 is a component diagram of a computer implemented arrangement for detecting increased vulnerability of a software system 200 in accordance with embodiments of the present disclosure. Many of the elements of FIG. 5 are identical to those described above with respect to FIG. 2 and these will not be repeated here. In FIG. 5 the distinction between software components and classes of software component are clearly indicated and a separate neural network is trained for each of software components and classes. In this way a plurality of embeddings 514a over times t are generated for the software system 200 based on vector representations of classes of software component, and a plurality of embeddings 514b over times t are generated for the software system 200 based on vector representations of software components. Accordingly, the embedding generator 202 receives data records from the vulnerabilities database 222 including vulnerability information for classes of software components 568 and vulnerability information for software components 570. The training data generator 206 thus generates two separate sets of training data. A first set of training data 572a is generated based on software component class information from vulnerability database 222 records. A second set of training data 572b is generated based on software component information from vulnerability database 222 records. Subsequently, trainers 510a and 510b (which could be provided as a single trainer) each train a neural network 512a and 512b such that neural network 512a is trained for classes of software component and neural network 512b is trained for software components. Thus vector representations for each class of software component in a corpus of all classes can be extracted from class neural network 512a. Similarly, vector representations for each software component in a corpus of all software components can be extracted from component neural network 512b. Subsequently, class embeddings 514a are generated as aggregates of class vector representations corresponding to software component classes for software system 220. Further, component embeddings 514b are generated as aggregates of software component vector representations corresponding to software components for software system 220. According to such an embodiment, the comparator is thus arranged to compare a series of class embeddings 514a and a series of component embeddings 514b for each of different times t in order to identify changes to embeddings over time as a trigger for protective measures 218.

Figure 6:
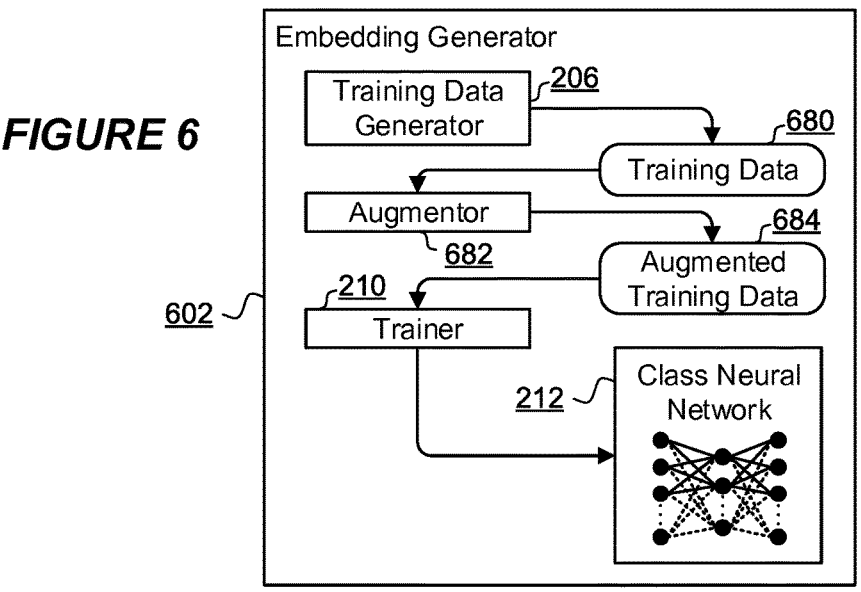
FIG. 6 is an alternative arrangement of the embedding generator of FIG. 1 in accordance with embodiments of the present disclosure.

FIG. 6 is an alternative arrangement of the embedding generator of FIG. 1 in accordance with embodiments of the present disclosure. Many of the elements of FIG. 6 are identical to those described above with respect to FIG. 2 and these will not be repeated here. Further, the embedding generator 602 of FIG. 6 is equally applicable to the arrangement of FIG. 5 with appropriate modifications as will be apparent to those skilled in the art. The embedding generator 602 of FIG. 6 is adapted to enhance the training data 680 by augmenting it. Thus, the embedding generator 602 includes an augmenter 682 as a software, hardware, firmware or combination component arranged to receive or access each item of the training data 680 and the data records received from the vulnerability database 222 (not shown in FIG. 6) on the basis of which the training data 680 was generated. The augmenter 682 generates augmented training data 684 corresponding to the training data 680 with augmentations. The augmented training data 684 is then used by the trainer 210 to train the neural network 212 as previously described.

Specifically, the augmenter 682 performs augmentation of the training data 680 by replicating training data items so that they appear more than once in the augmented training data 684. A determination of whether to replicate a training data item is made based on one or more attributes of a vulnerability database 222 data record corresponding to the training data item. The replication may involve mere duplication of one, more than one or all training data items generated based on a vulnerability database 222, or repetition of such training data items multiple times in the augmented training data 684. In this way, characteristics of vulnerability database 222 data record deemed significant (based on one or more attributes) are emphasized in the augmented training data 684 by replication of training data items. In one embodiment, such significance is determined based on a value of one or more attributes in a vulnerability database 222 data record, such as attributes corresponding to a score, impact or complexity of a vulnerability. In this way, more significant vulnerabilities are emphasized in the augmented training data 684 by replication of training data items. Similarly, characteristics of the software component and/or class indicated in a vulnerability database 222 data record can lead to replication. For example, the augmenter 682 can augment training data 680 to augmented training data 684 by replicating training data items in response to a determination that a value of a score attribute of a vulnerability corresponding a training data item exceeds a predetermined threshold.

Figure 7:
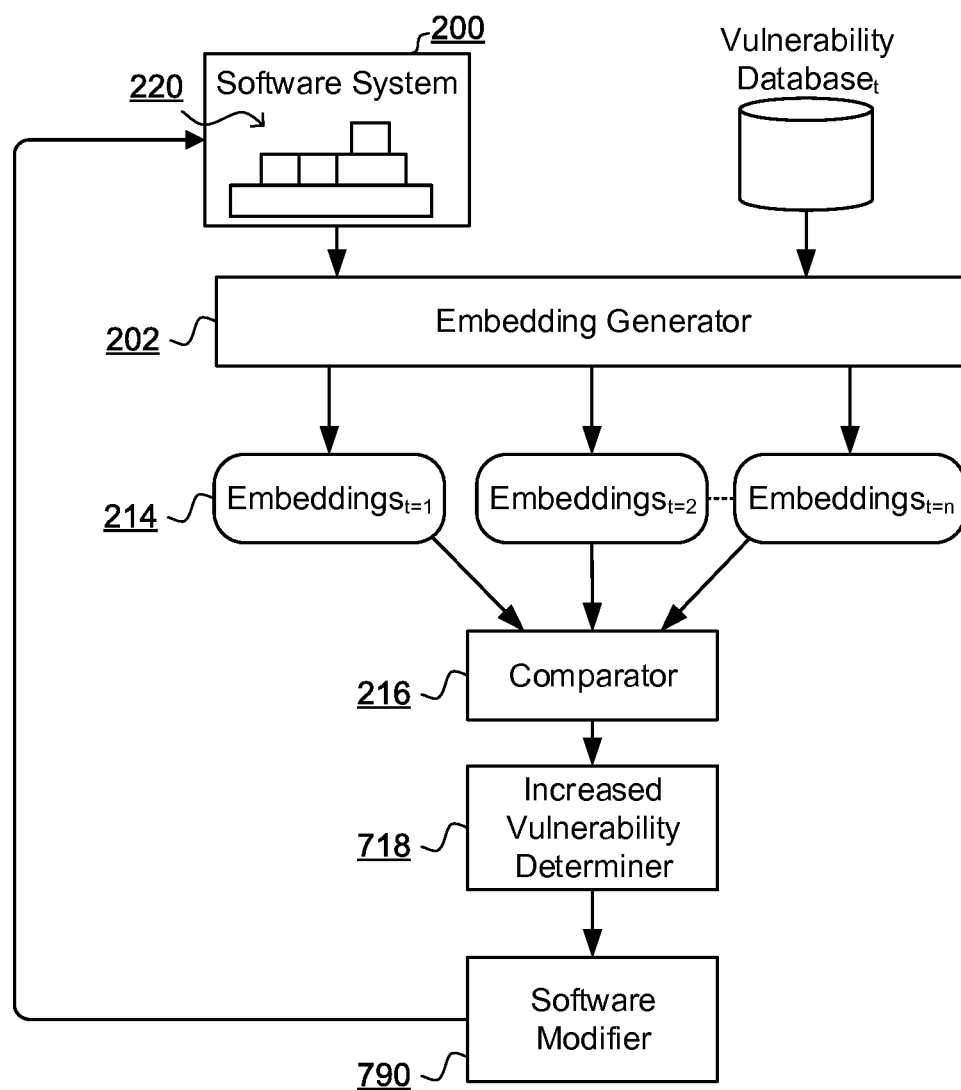
FIG. 7 is a component diagram of a computer implemented arrangement for detecting and remediating increased vulnerability of a software system in accordance with embodiments of the present disclosure.

FIG. 7 is a component diagram of a computer implemented arrangement for detecting and remediating increased vulnerability of a software system 200 in accordance with embodiments of the present disclosure. Some of the features of FIG. 7 are identical to those described above with respect to FIGS. 2, 5 and 6 and these will not be repeated here. According to the arrangement of FIG. 7 the comparator informs an increased vulnerability determiner 718 as a software, hardware, firmware or combination component adapted to determine whether a vulnerability for software system 200 has increased sufficiently to trigger remediation of the software system 200 so as to reduce a vulnerability of the system 200. Notably, remediation differs from mitigation in that an objective of remediation is to affect a vulnerability of the software system 200 such that a level or degree of vulnerability of the software system 200 is within permitted levels. Permitted levels of vulnerability can include a threshold degree of vulnerability indicated by a degree of difference (or change) between embeddings for the software system between two points in time t and t+u. For example, an acceptable or permitted level of vulnerability can be a level of vulnerability that is known to be effectively mitigated by mitigation measures such as those previously described. Where a degree or level of vulnerability exceeds such a permitted or acceptable level, remediation by way of improving the level of vulnerability (by reducing vulnerability such as by eliminating one or more vulnerabilities) is preferred.

Accordingly, where the increased vulnerability determiner 718 determines that a level of vulnerability exceeds an acceptable threshold (or meets a predetermined level), a software modifier 790 is triggered to effect modifications to the software system 200 so as to affect a change to a degree of vulnerability of the software system 200 that is intended to reduce a degree of difference between an embedding generated for the software system 200 so changed and embeddings for previous times t. Notably, in such a situation, comparison with an embedding known to exceed a maximum threshold degree of difference from previous embeddings should be excluded from comparison with an embedding or a new modified version of the software system 200.

According to embodiments of the present disclosure in accordance with FIG. 7, software components in the software system 200 are iteratively adjusted and, at each iteration, a new aggregate vector representation (embedding) 214 for the software system 200 so adjusted is generated. Each regenerated embedding 214 is compared with the multiple previous embeddings to identify one or more software component adjustments leading to a change in the embedding not exceeding a maximum threshold degree of change. In this way, the vulnerability of the software system 200 is reduced.

Adjustment to the software system 200 can include, inter alia: replacing one or more software components with alternative compatible software components; replacing one or more software components with alternative versions of the software components; upgrading or updating one or more software components in the software system 200; and patching one or more software components in the software system with an available software patch intended to reduce a vulnerability of the software components.

Figure 8:
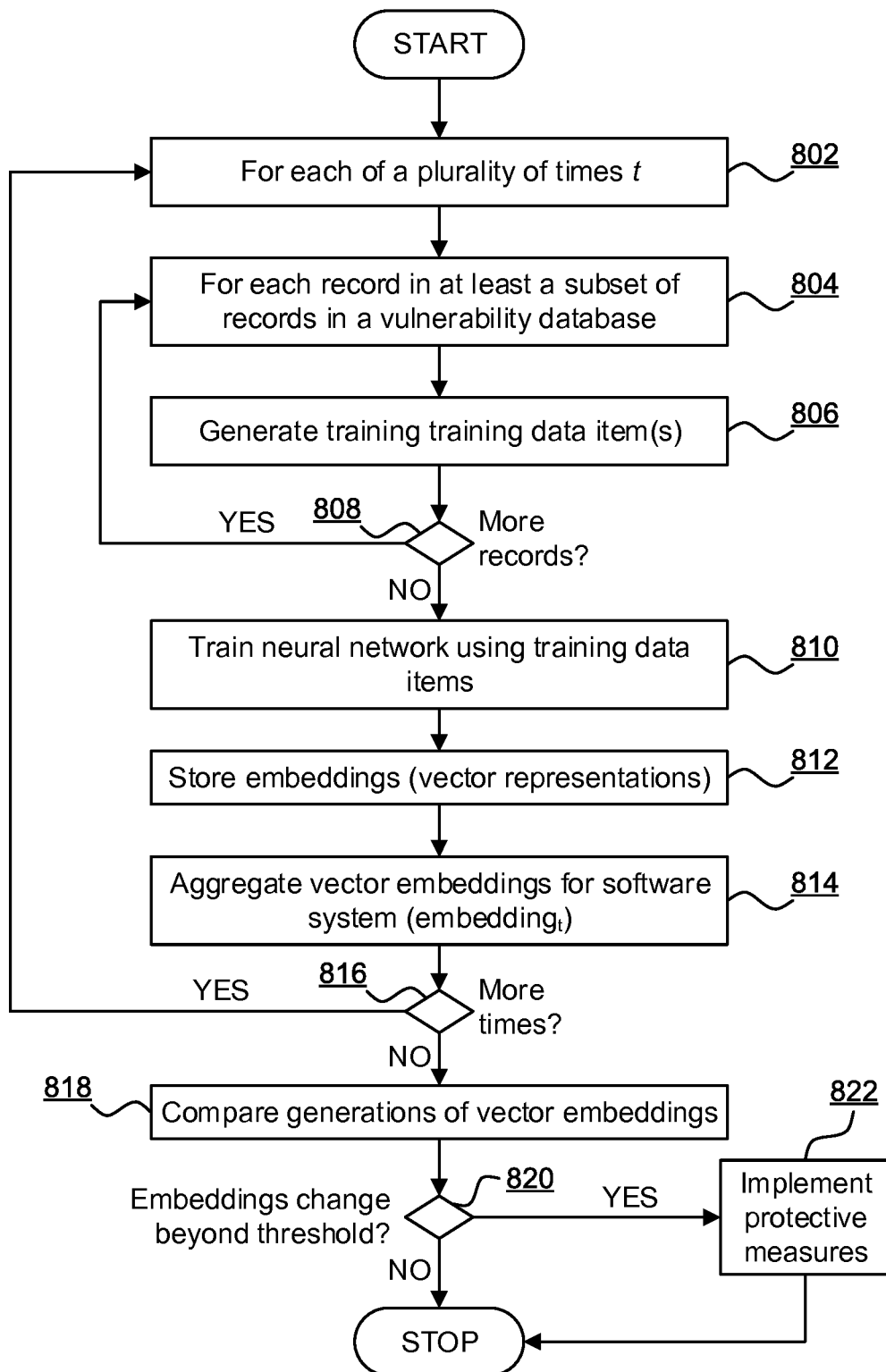
FIG. 8 is a flowchart of a computer implemented method of detecting increased vulnerability of a software system in accordance with embodiments of the present disclosure.

FIG. 8 is a flowchart of a computer implemented method of detecting increased vulnerability of a software system 200 in accordance with embodiments of the present disclosure. Initially, at 802, an iteration through each of a series of times t is initiated. At 804 a nested iteration is initiated through each of at least a subset of data records in the vulnerability database 222. At 806 one or more training data items are generated for a current data record from the database 222. At 808 the method iterates until all records are processed. At 810 the method trains a neural network 212 using the training data generated at 806. At 812 vector representations (embeddings) for each of the software components and/or classes of software component are generated from the trained neural network 212. At 814 an aggregate vector representation (embedding) 214 is generated for the software system 200 by aggregating vector representations for software components and classes of the software system 200. At 816 the method iterates through all times t. At 818 the comparator compares the multiple generations (for each time t) of embeddings 214 for the software system 200 and, where a change between embeddings 214 exceeds a maximum threshold change, the method implements protective measures at 822. Notably, in some embodiments, 822 triggers the implementation of remediations as described above with respect to FIG. 7 and below with respect to FIG. 10.

Figure 9:
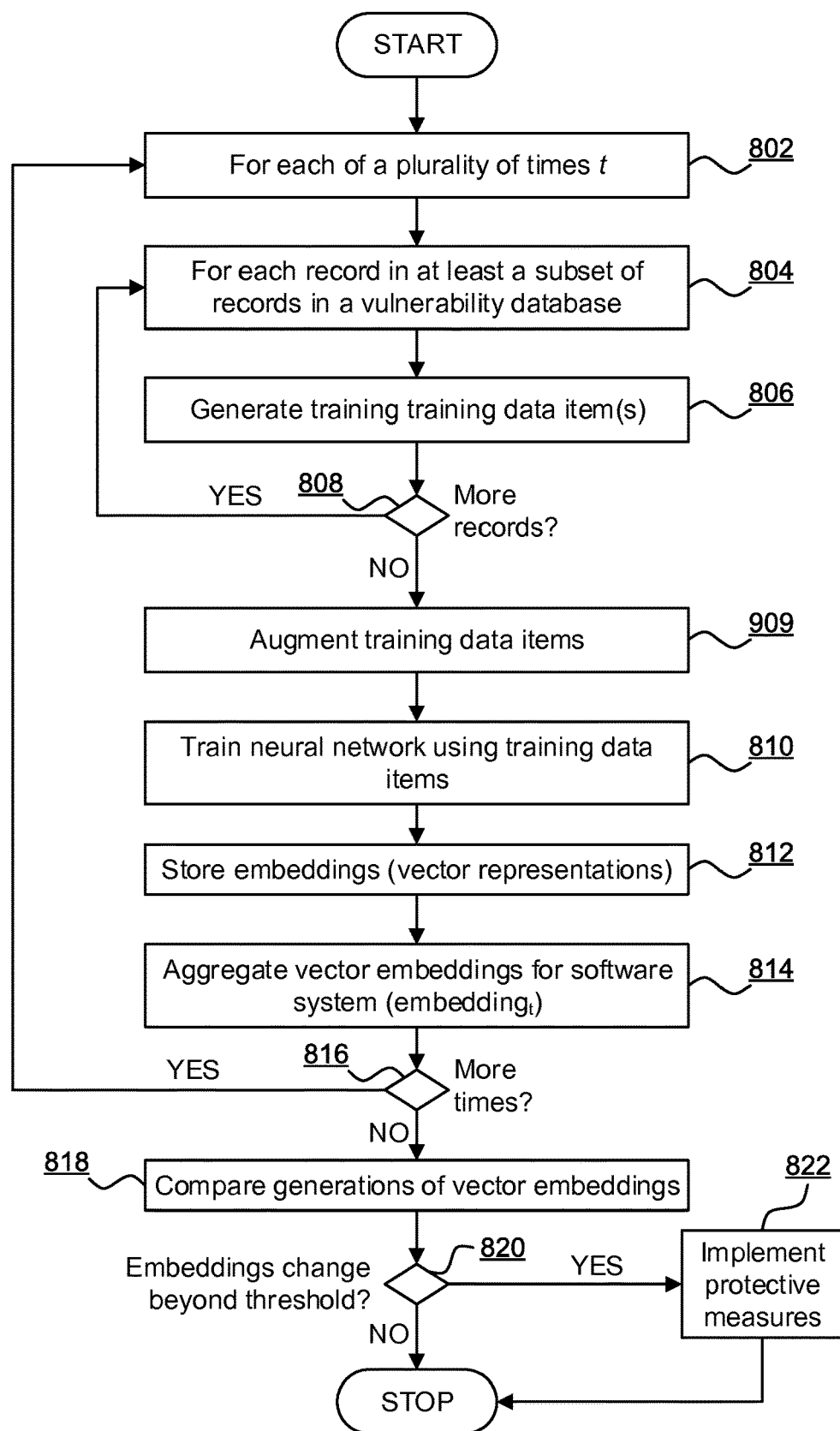
FIG. 9 is a flowchart of an alternative computer implemented method of detecting increased vulnerability of a software system in accordance with embodiments of the present disclosure.

FIG. 9 is a flowchart of an alternative computer implemented method of detecting increased vulnerability of a software system 200 in accordance with embodiments of the present disclosure. The activities of FIG. 9 are identical to those described above with respect to FIG. 8 except that, at 909, training data items are augmented before training the neural network 212 at 810 as previously described with respect to FIG. 6.

Figure 10:
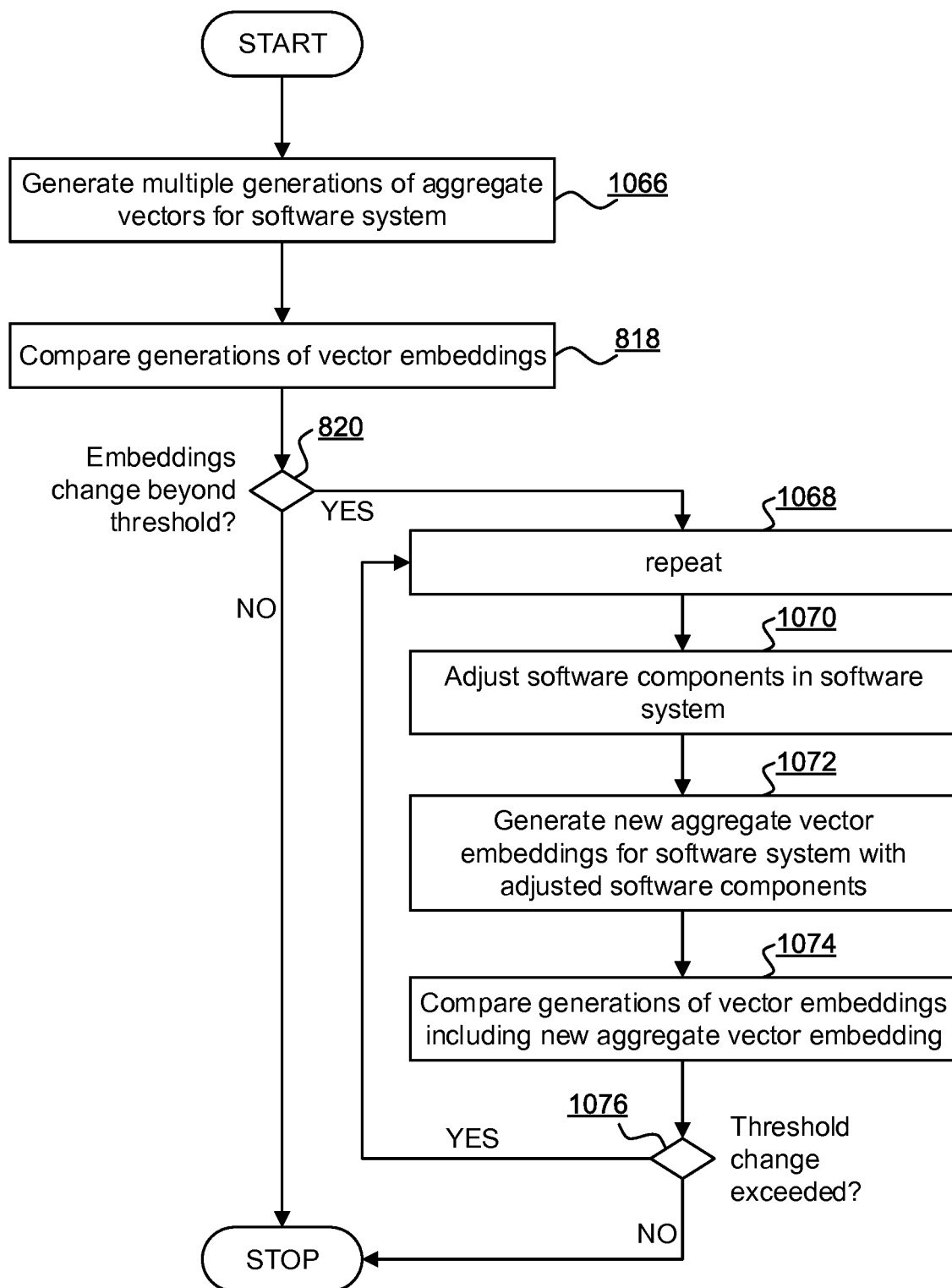
FIG. 10 is a flowchart of a computer implemented method of detecting and remediating increased vulnerability of a software system in accordance with embodiments of the present disclosure.

FIG. 10 is a flowchart of a computer implemented method of detecting and remediating increased vulnerability of a software system 200 in accordance with embodiments of the present disclosure. Initially, at 1066, the method generates multiple generations of aggregate vectors for the software system 200 using the method of, for example, FIG. 8 or FIG. 9. At 818 the comparator compares the multiple generations (for each time t) of embeddings 214 for the software system 200 and, where a change between embeddings 214 exceeds a maximum threshold change, the method proceeds to 1068. At 1068 the method commences an iteration of 1070 to 1074. At 1070 the software components of the software system 200 are adjusted as previously described. At 1072 a new aggregate vector representation (embedding) is generated for the software system 200 so adjusted. At 1074 the generations of vector embeddings generated at 1066 are compared with the new embedding generated at 1072. Notably, preferably, a generation of embedding generated at 1066 that caused a change exceeding a maximum threshold degree of change at 820 is excluded from the comparison at 1074 as it represents an unacceptable degree of change. At 1076, if the threshold degree of change determined by the comparison of 1074 exceeds the maximum acceptable degree, the method iterates to 1068. Otherwise the method concludes as the adjusted software system 200 has a suitable reduction in a degree or level of vulnerability.

FIG. 5 is a flowchart of an exemplary method of detecting anomalous behavior within a computer network in accordance with embodiments of the present disclosure. Initially, at 502, the method commences an iteration through a series of predetermined or determinable time periods t. At 504 a set of network communication data records 204 for the time period are accessed. At 506 an iteration is commenced for each data record in the set of accessed network communication data records 204. At 508 the method generates one or more training data items for the current network communication data record 204. At 510 the iteration continues for all network communication data records 204. According to some embodiments, the method subsequently augments, at 512, the set of all training data items generated at 508 for the current time period t by the augmenter 430 as previously described. At 514 the neural network 212 is trained using the training data 208 (or, where augmented, the augmented training data 432). At 516 the vector embeddings 214 for each value in the corpus of attribute values are stored for the current time period t. At 518 the method iterates for all time periods. Subsequently, at 520, the anomaly detector 216 compares generations of vector representation embeddings 214, e.g. using a vector similarity function such as cosine similarity. At 522 detected anomalies lead to 524 at which protective measures are deployed.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of remediating an increased vulnerability of a software system including a plurality of software components, the method comprising:
generating a vector representation of each software component derived from a neural network trained using training data defined from known vulnerabilities of the plurality of software components in the software system;
aggregating the vector representations for the software component to an aggregate vector representation for a particular time;
repeating the generating and the aggregating for a plurality of points in time to generate multiple generations of aggregate vector representations; and
comparing the multiple generations of aggregate vector representations to detect a change in an aggregate vector representation exceeding a maximum threshold degree of change as an indication of an increased vulnerability of the software system, responsive to which iteratively adjusting the software components in the software system and, at each iteration, regenerating an aggregate vector representation for the software system so adjusted to compare with the multiple generations of aggregate vector representations to identify a software component adjustment leading to a change in vector representation not exceeding the maximum threshold degree of change so as to reduce the vulnerability of the software system.

2. A computer implemented method of remediating an increased vulnerability of a software system including a plurality of software components, the method comprising:
accessing data records each corresponding to a known software vulnerability, each data record including an identification of one or more software components affected by the known software vulnerability;
generating, for each of at least a subset of the data records, one or more training data items for a neural network, each training data item associating a vulnerability of the data record with affected software components identified by the data record, the neural network having input units corresponding to items in a corpus of all software components and output units corresponding to items in a corpus of all vulnerabilities;
training the neural network using the training data so as to define a vector representation for each software component in the corpus of all software components based on weights in the neural network for an input unit corresponding to the software component;
aggregating, for a subset of software components in the corpus corresponding to software components in the software system, vector representations for each software component in the subset to an aggregate vector representation for the software system for the particular time;
repeating the accessing, the generating, the training and the aggregating at a subsequent time to generate multiple generations of aggregate vector representations for the software system, each generation corresponding to data records accessed at a different time;
comparing the multiple generations of aggregate vector representations for the software system to detect a change in one or more aggregate vector representation exceeding a maximum threshold degree of change as an indication of an increased vulnerability of the software system; and
responsive to the indication of an increased vulnerability, iteratively adjusting the software components in the software system and, at each iteration, regenerating an aggregate vector representation for the software system so adjusted, and comparing each regenerated aggregate vector representation with the multiple generations of aggregate vector representations to identify a software component adjustment leading to a change in vector representation not exceeding the maximum threshold degree of change so as to reduce the vulnerability of the software system.

3. The method of claim 2, wherein adjusting the software components in the software system includes replacing a software component in the software system with a compatible alternative software component.

4. The method of claim 2, wherein adjusting the software components in the software system includes replacing a software component in the software system with an alternative version of the software component.

5. The method of claim 2, wherein adjusting the software components in the software system includes upgrading or updating a software component in the software system.

6. The method of claim 2, wherein adjusting the software components in the software system includes patching a software component in the software system with an available software patch intended to reduce a vulnerability of the software component.

7. The method of claim 2, wherein a new neural network is trained at each repetition of the training.

8. The method of claim 2, wherein the neural network has a single layer of hidden units, a number of which is smaller than each of: a number of input units of the neural network; and a number of output units of the neural network.

9. The method of claim 2, wherein comparing multiple generations of aggregate vector representations includes performing a vector similarity function on the aggregate vector representations to determine a degree of similarity.

10. The method of claim 9, wherein the identification of a change in an aggregate vector representation indicative of an increased vulnerability of the software system includes detecting a vector similarity below a predetermined threshold degree of similarity.

11. The method of claim 7, wherein comparing multiple generations of aggregate vector representations includes, for each of one or more software components in the corpus of all software components, training a recurrent neural network based on the multiple generations of aggregate vector representations such that the trained recurrent neural network is suitable for classifying a subsequent aggregate vector representation as indicative of increased vulnerability in relation to multiple generations of aggregate vector representations.

12. A computer system comprising:
a processor and memory storing computer program code for performing the method of claim 1.

13. A non-transitory computer-readable storage element storing computer program code to, when loaded into a computer system and executed thereon, cause the computer system to perform the method as claimed in claim 1.

* * * * *